Feb. 1, 1966

J. O. POUNDER ET AL 3,232,840

NUCLEAR REACTOR FUEL HANDLING APPARATUS

Filed Oct. 19, 1961

United States Patent Office 3,232,840
Patented Feb. 1, 1966

3,232,840
NUCLEAR REACTOR FUEL HANDLING
APPARATUS
John Ormerod Pounder, Up Holland, and Eric Watson, Culcheth, Warrington, England, assignors to United Kingdom Atomic Energy Authority, London, England
Filed Oct. 19, 1961, Ser. No. 146,206
Claims priority, application Great Britain, Oct. 28, 1960, 37,226/60
3 Claims. (Cl. 176—30)

The present invention relates to nuclear reactors, more particularly heterogeneous reactors for the production of useful power. Heat from which this power is derived is generated in the reactor core where nuclear fuel formed as fuel elements undergoes fission. The consumption of the fuel as fission continues during operation of the reactor necessitates that the fuel is replaced periodically by fresh fuel in order to keep the reactor operational. The servicing of the reactor core in this respect entails the discharging of a fuel element from the core as a preliminary to its replacement, and the problem arises of preventing disintegration of the discharged element during transit to the disposal point by the evolution of heat from the decay of fission products now present in the element. At the stage in the discharging procedure when the element ceases to benefit from the core cooling system, an additional cooling system is required to continue the cooling of the discharged element.

For the servicing of a power producing nuclear reactor core contained within a vessel, the invention provides a method of abstracting a fuel element from the core as a preliminary to its replacement by another element which comprises introducing a carrier to a position within the vessel immediately adjacent the exit from the core of the element to be abstracted, withdrawing the element from the core to a position of total immersion in liquid contained by the carrier, and transporting the carrier with the element remaining so positioned therein to a disposal point for the element. The liquid filling of the carrier affords supplementary thermal mass for absorbing decay heat and establishes a thermal conduction path to the carrier structure from all points of the surfaces of the element; the latter function being of importance especially in the case where the element previously referred to is in fact a sub-assembly of clustered elements removable as a unit.

It is of the essence of the invention that the fuel element to be abstracted is introduced into the carrier as soon as the element is sufficiently clear of the core structure to permit the transfer, and for this purpose the carrier is brought as close as possible to the location of the element in the core. The greater facility of handling which the immersion in the carrier liquid allows is therefore immediately available. In this respect advantages are gained over the previous proposal, which was that, in reactor cores which are submerged beneath the free surface of a pool of the core coolant liquid, abstracted elements are transferred to a disposal point, submerged elsewhere in the pool, without breaking the liquid free surface. Working below the surface is not necessary with the present invention and the element in the carrier may be lifted with safety through the space above the liquid surface and through the wall of the core containing vessel to the interior of a charging machine, for example. If the element is to remain for any length of time within the confined interior of such a machine it is advisable to assist heat dissipation by radiation from the carrier by providing in known manner a system for circulating a cooling gaseous medium over the carrier.

For carrying out the method of the invention there is provided, in or for a nuclear reactor having a core contained within a vessel, the combination with a charging machine having a grab movable linearly towards and away from the core of a fuel element carrier adapted to carry a fuel element and liquid drowning it, the grab being actuable to either one of two different states of which one is for grasping the carrier and the other for grasping a fuel element.

The invention further provides, in or for a nuclear reactor having a core contained within a vessel, the combination with a charging machine having a grab movable linearly towards and away from the core along a path eccentric but parallel to the axis of rotation of rotary grab guiding means, of a fuel element carrier adapted to carry a fuel element and liquid drowning it and shaped externally to register non-rotatably with structure of the core. The grab is actuable to either one of two different operative states of which one is for grasping the carrier and the other for grasping the fuel element, whereby the same grab may be utilised for transporting the carrier and for withdrawal of a fuel element from the core into the carrier, the latter operation being performed by registering the carrier with the core structure at a location from which the grab is alignable with the element to be withdrawn by rotation of the rotary grab guiding means.

An embodiment of invention is illustrated by way of example in the accompanying drawings, in which.

Figure 4:
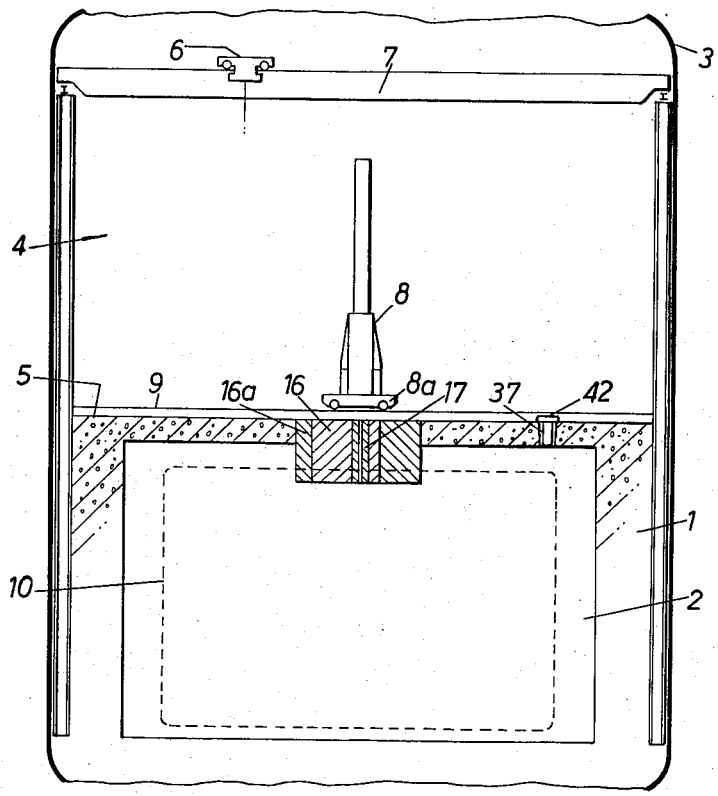
FIG. 4 is a section showing diagrammatically outlines of a power producing nuclear reactor installation of the fast reactor type equipped for fuel handling in accordance with the present embodiment.

As seen in FIG. 4, biological concrete shielding 1 defining internally a cylindrical reactor vault 2 is contained within an upstanding dome-ended cylindrical outer containment vessel 3 which is fabricated of welded steel plate and of which the upper half 4 of its interior is left free above the upper surface or charge floor 5 of the biological shielding for the handling of reactor components. For general handling purposes a travelling crane of the kind having a carriage 6 traversable on a gantry 7 is installed above the charge floor. For the more specific purpose of handling fuel a charging machine 8 including a self-propelled supporting carriage 8a is movable across the charge floor on tracks as indicated at 9. An open-topped tank 10 fabricated of welded steel plate is accommodated in the reactor vault 2 and contains a pool of liquid metal coolant, such as sodium, in which the core is submerged. The tank together with the cover constituted by the charge floor shielding forms a vessel totally enclosing the core.

Figure 1A:
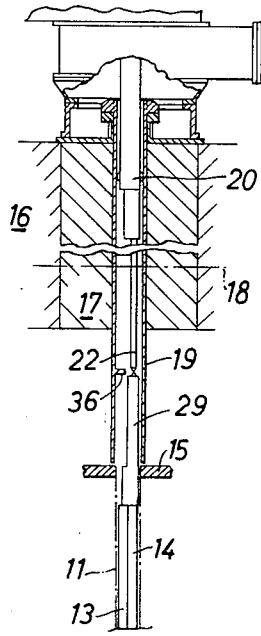
FIGS. 1A, 1B and 1C are schematic representations of the charging machine at different stages in the operation of discharging a fuel element sub-assembly.
Figure 1B:
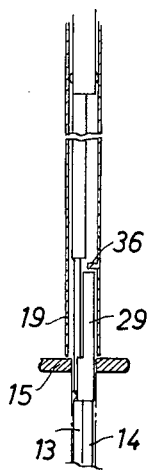
Figure 1C:
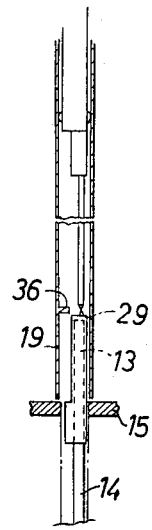
Figure 2:
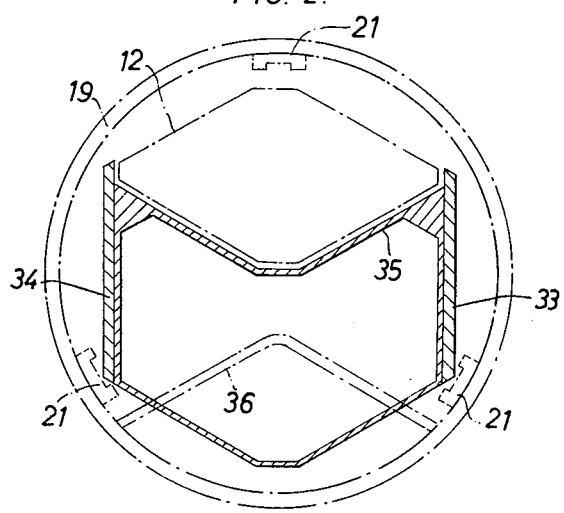
FIG. 2 is a sectional plan view of the carrier to an enlarged scale with certain details of other structure superimposed in chain dotted outline.

The core structure provides a number of vertical channels of which only one, denoted 11, is shown in FIGS. 1A to 1C. In cross section this particular channel 11 is shaped as a hexagon to accommodate three contiguously clustered fuel element sub-assemblies each having a cross section of rhomboid shape. This shape appears in FIG. 2 where the outline of a sub-assembly is indicated by the reference numeral 12; the two sub-assemblies seen in FIGS. 1A to 1C are denoted 13 and 14. A top plate 15 surmounting the core structure presents an aperture of corresponding hexagonal shape giving access to the channel 11. Installed in the middle of the charge floor shielding is a rotating shield assembly comprising an inner shield 16 set eccentrically in an outer shield 16a, the inner shield having an eccentrically disposed rotary sealing plug 17 with a central hole through which the charging machine is operative for servicing of the core. The shield assembly penetrates into the coolant pool of which the free surface level is indicated by the broken line 18.

A straight liner tube 19 is fixed in the central hole running through the plug 17 and extends downwardly so that the lower free end is just clear of the core plate 15. Within the tube a carriage 20 is guided by engagement of rollers on the carriage in straight channel shaped runners 21 (FIG. 2) mounted internally of the liner tube, the carriage being therefore freely movable linearly towards and away from the core but restrained against rotation relative to the liner tube. The line of movement of a grab 22 depending from the carriage is eccentric but parallel to the axis of the liner tube.

Figure 3:
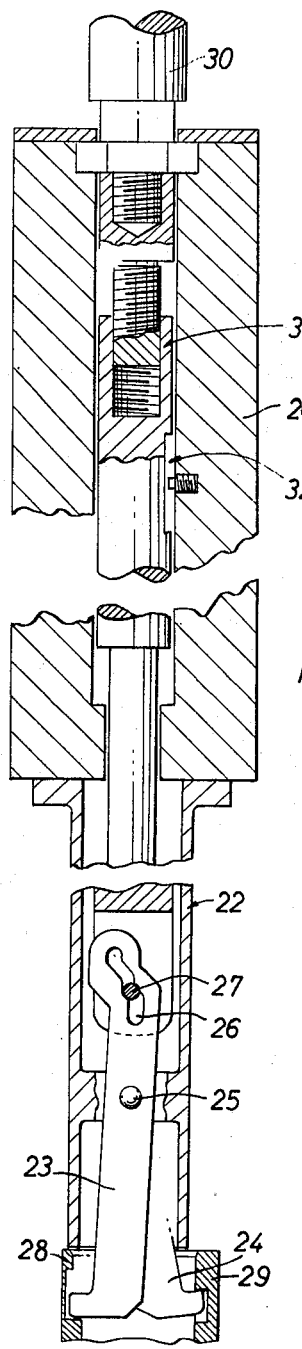
FIG. 3 is a diagrammatic sectional view of the grab together with its operating mechanism.

The grab 22 is shown in greater detail in FIG. 3 and comprises a pair of claw plates 23 and 24 having a common pivot 25 at a point intermediate their ends and disposed back to back with their claws oppositely directed. At the other ends to the claws, these plates have double dog-leg slots, such as 26, into which projects an actuating pin 27. These slots are oppositely directed so that by lifting the actuating pin relative to the claw plates the claws are spread apart firstly to an assembly grasping state corresponding to the pin being midway along the slots and secondly, by further relative lifting of the pin, to a carrier grasping state corresponding to the pin being at the upper ends of the slots. The claw plate 23 is shown in the assembly grasping state while the claw plate 24 is shown in the carrier grasping state; in both cases it will be apparent that the fuel element sub-assembly 28 or carrier 29 is grasped by engagement of the claws in diametrically opposed undercut recesses which serve also to orientate the sub-assembly or carrier relative to the grab.

Mechanism for lifting the actuating pin relative to the claw plates depends on a lift bar 30 being rotatable and comprises a screw and nut device indicated generally 31 in the carriage 20 to translate the rotary input from the lift bar into linear lifting and lowering movement applied to the actuating pin 27, the linearly movable component of the device 31 being held against rotation by a pin and slot arrangement indicated generally 32.

The carrier 29 is basically an open-topped container shaped so that a fuel element sub-assembly fits snugly therein to its full height. However, over a minor portion of its length adjacent the lower end, the carrier has opposed parallel plates 33 and 34 affixed to it to make up four sides of a hexagonal shape for location in the aperture of the core plate 15. Furthermore, over this same portion, the shape of the interior is modified so that the inner wall 35 forms two sides of a rhomboid shape corresponding, but diametrically opposed, to the shape defined within the main length of the carrier. This modification of interior shape also serves to enlarge the capacity of the carrier and this in turn increases the contained thermal mass in a manner to be explained more fully subsequently. For co-operating with the carrier, the liner tube 19 has an internal projection 36 off-set from the tube axis in diametrical opposition to the grab 22 and disposed to overlie the upper end of the carrier when this is rotated relative to the carrier to the position in which the projection appears in FIG. 2. The weight distribution in the carrier is such that it hangs vertically.

The procedure for discharging a fuel element sub-assembly using the apparatus as described up to this point will now be explained with reference to FIGS. 1A to 1C. Assuming that the sub-assembly 13 has been selected for discharge from the channel 11, the plug 17 is rotated until the grab 22 is so positioned that the vacant carrier 29 presently suspended therefrom has the guide surface constituted by the wall 35 aligned with the sub-assembly 13. The grab is then lowered to register the carrier with the aperture in the core plate 15 and, by virtue of the interfitting non-circular outlines of the aperture and the lower length of the carrier, the latter is located firmly against rotation resting on the tops of the fuel element sub-assemblies as shown in FIG. 1A.

The grab is now actuated to release its grasp of the carrier and the plug 17 is rotated through a half circle to align the grab with the sub-assembly to be discharged, this rotation also bringing the projection 36 over the upper end of the carrier. Lowering of the grab alongside the carrier to the lower level of the sub-assembly then takes place and the sub-assembly is grasped by actuation of the grab to the appropriate state as previously described. This stage is illustrated in FIG. 1B.

The grab is now lifted until the attached subassembly 13 is clear of the projection 36, whereupon the plug 17 is rotated again through a half circle to align the sub-assembly with the carrier. During lifting of the sub-assembly 13, the projection 36 overlying the top of the carrier holds the latter against the core to resist any tendency for the other sub-assemblies, such as 14, to lift simultaneously. By lowering of the grab, the sub-assembly is now introduced into the carrier as shown in FIG. 1C. By appropriate actuation of the grab the sub-assembly is released and the grasp transferred to the carrier which is now ready for transporting to a disposal point.

Figure 5:
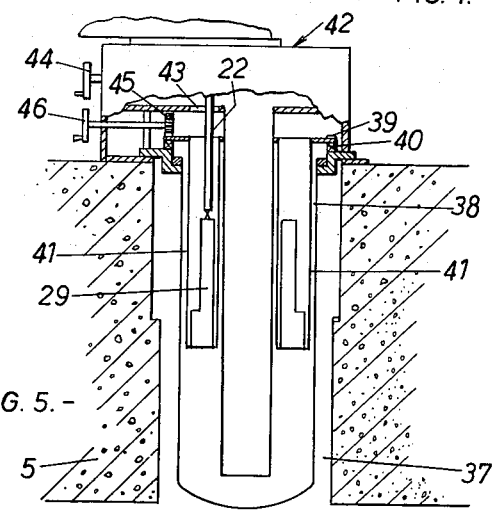
FIG. 5 is a detail of FIG. 4 to an enlarged scale showing a fuel element store.

Such a disposal point is represented for the purposes of the present example by a rotary magazine as seen in FIG. 5 which is disposed in a cavity 37 in the charge floor shielding (FIG. 4). The magazine comprises on open-topped cylindrical container 38 suspended within the cavity, a rotary plate 39 supported on bearings 40 at the rim of the container, and a ring of storage tubes such as 41 with open upper ends carried by the plate 39. A cover box 42 over the cavity 37 has apertures such as 43 through which a sub-assembly carrier can be passed and in the upper portion of the box is accommodated a closure valve (not shown) operable by a handwheel 44 to close the apertures. Any one of the storage tubes 41 is registrable with the apertures through the cover box by means of an indexing mechanism which comprises a pinion 45 rotatable by a handwheel 46 and meshing with a circular rack on the upper face of the rotary plate 39.

To reach the magazine in the cavity 37, the sub-assembly carrier is withdrawn through the liner tube to a lead-shielded section (not shown) in the upper part of the charging machine 8 which section is equipped with a system for circulating a cooling gas stream of nitrogen over the carrier. The charging machine may then be moved bodily to the magazine where the sub-assembly can be discharged complete with its carrier into a vacant storage tube 41 brought into alignment with the apertures through the cover box.

Having been plunged into the liquid metal coolant pond, the carrier brings the fuel element sub-assembly into the charging machine in a position of total immersion in liquid metal coolant remaining in the carrier. The sub-assembly is composed of a number of parallel sheathed rods of nuclear fuel which could not dissipate decay heat quickly enough merely by radiation to prevent undesirable overheating, possibly to the point of causing the fuel to melt. The presence of the liquid metal filling the interstitial spaces establishes a path for heat dissipation by conduction to the carrier structure from which radiation takes place over a larger area. The thermal mass of the liquid metal filling, of which the volume is augmented by the enlargement of the carrier interior over its lower length, also assists in preventing overheating.

To replace the discharged fuel element sub-assembly by a fresh sub-assembly, the previously described procedure is reversed. It may be noted, however, that at the stage of transferring the sub-assembly from the carrier to the correct position in the channel, the sub-assembly must be correctly oriented as it approaches the channel in order to clear the wall 35 of the carrier. The carrier may or may not have a liquid metal filling when the new sub-assembly is being introduced.

We claim:

1. In a nuclear reactor having a core contained within a vessel, the combination with a charging machine having a grab movable linearly along an axis towards and away from the core along a path eccentric but parallel to the axis of rotary grab guiding means, of a fuel element carrier for carrying a fuel element together with liquid drowning it and registrable by rotation-restraining engagement with structure of the core, means for actuating the grab between two different positions of which one is for grasping the carrier and the other for grasping a fuel element, whereby the same grab may be utilised for transporting the carrier and for withdrawal of a fuel element from the core into the carrier, the latter operation being performed by registering the carrier with the core structue at a location from which the grab is alignable with the element to be withdrawn by rotation of the rotary grab guiding means.

2. A fuel element charging machine for a nuclear reactor which machine comprises a shielded enclosure, a rotatable straight tube open at one end thereof and opening at the other end into said enclosure, a grab movable linearly within said tube, means for actuating said grab between two different operative positions of which one is for grasping a fuel element and the other for grasping a fuel element carrier, means guiding said grab along a path having a fixed relationship eccentric but parallel to the axis of said tube, and means disposed within said tube and operative only in a rotational position of said tube in which said grab is out of alignment with and free to move alongside a carrier entered into said tube at said open end to prevent displacement of said carrier further towards said shielded enclosure.

3. For a nuclear reactor having a core contained within a vessel, the combination comprising a fuel element charging machine having a straight tube for insertion into said vessel and a grab movable linearly within said tube, a fuel element carrier for carrying a fuel element together with liquid drowning it and movable linearly through said tube, means for actuating the grab between two different positions of which one is for grasping said carrier and the other for grasping a fuel element, and means disposed on said tube to cooperate with said carrier and having a first position assumed when said grab and said carrier are aligned and a second position assumed in a condition of non-alignment of said grab and said carrier, said means allowing free passage of said carrier in said tube when in said first position and holding said carrier against movement relative to said tube when in said second position.

References Cited by the Examiner

UNITED STATES PATENTS

| | | | |
|---|---|---|---|
| 2,770,591 | 11/1956 | Wigner | 176—31 |
| 2,853,625 | 9/1958 | Ohlinger | 176—32 X |
| 3,039,949 | 1/1962 | Newton | 214—27 |
| 3,044,947 | 7/1962 | Payne | 214—21 |
| 3,051,642 | 8/1962 | Dent | 176—30 |

FOREIGN PATENTS 1,236,554   6/1960   France.

OTHER REFERENCES

Kumpf: German application #1,045,003, printed November 27, 1958 (KL 21g 21/20), 3 pp. spec., 1 sht. dwg.

Kumpf: German application #1,065,101, printed September 10, 1959 (KL 21g 21/20), 2 pp. spec., 1 sht. dwg.

German application #1,055,705, printed April 23, 1959 (KL 21g 21/20) (1 sht. dwg., 3 pp. spec.).

German application #1,060,998, printed July 9, 1959 (KL 21g 21/20) (1 sht. dwg., 2 pp. spec.).

Nucleonics, June 1955, vol. 13, No. 6, pp. 52–55.

CARL D. QUARFORTH, *Primary Examiner.*

OSCAR R. VERTIZ, *Examiner.*